United States Patent
Yoshie

(10) Patent No.: US 9,170,440 B2
(45) Date of Patent: Oct. 27, 2015

(54) POLYMER OPTICAL ISOLATOR

(71) Applicant: Tomoyuki Yoshie, Orinda, CA (US)

(72) Inventor: Tomoyuki Yoshie, Orinda, CA (US)

(73) Assignee: Duke University, Durham, NC (US)

( * ) Notice: Subject to any disclaimer, the term of this patent is extended or adjusted under 35 U.S.C. 154(b) by 16 days.

(21) Appl. No.: 14/213,261

(22) Filed: Mar. 14, 2014

(65) Prior Publication Data

US 2014/0314371 A1   Oct. 23, 2014

Related U.S. Application Data

(60) Provisional application No. 61/802,172, filed on Mar. 15, 2013.

(51) Int. Cl.
  *G02B 6/43*  (2006.01)
  *G02F 1/095*  (2006.01)
  *G02B 6/42*  (2006.01)

(52) U.S. Cl.
  CPC ............ *G02F 1/0955* (2013.01); *G02B 6/4214* (2013.01); *G02B 6/43* (2013.01); *G02F 2202/022* (2013.01)

(58) Field of Classification Search
  CPC ... G02F 2202/022; G02F 1/0955; G02B 6/43; G02B 6/12004; G02B 6/4214
  USPC .......................................................... 385/14
  See application file for complete search history.

(56) References Cited

U.S. PATENT DOCUMENTS

| | | | |
|---|---|---|---|
| 3,760,305 A | 9/1973 | Mason et al. | |
| 3,838,368 A | 9/1974 | Ironfield | |
| 3,867,708 A * | 2/1975 | Bretting | 330/4.6 |
| 3,918,010 A * | 11/1975 | Marchalot | 333/113 |
| 4,642,585 A | 2/1987 | Saad | |
| 7,326,582 B2 | 2/2008 | Speyer et al. | |
| 7,567,604 B2 | 7/2009 | Accard et al. | |
| 7,995,893 B2 | 8/2011 | Bi et al. | |
| 8,009,942 B2 | 8/2011 | Yoshie et al. | |
| 8,306,371 B2 * | 11/2012 | Yokoi | 385/6 |
| 8,335,407 B2 * | 12/2012 | Yokoi | 385/14 |

(Continued)

OTHER PUBLICATIONS

Vanwolleghem et al., "Ferromagnetic-metal-based InGaAs(P)/InP optical waveguide isolator: electrical and magneto-optical characterisation", Proceedings Symposium IEEE/LEOS Benelux Chapter, 2002, Amsterdam, pp. 282-285.

(Continued)

*Primary Examiner* — Akm Enayet Ullah
(74) *Attorney, Agent, or Firm* — Mauriel Kapouytian Woods LLP; Michael Mauriel

(57) ABSTRACT

Various optical isolators are disclosed. One embodiment provides an optical isolator comprising a waveguide that includes polymer magneto-optical media. In a particular embodiment, the waveguide is dimensioned for single mode operation in the selected isolation range. A cross-section of the waveguide is inhomogeneous in terms of magneto-optical materials. Polymer magneto-optical material is a part of the optical waveguide structure. The inhomogeneity induces the propagation constant shift, which is propagation-direction-dependent. An embodiment is characterized by a cutoff frequency for forward propagating waves that is different than the cutoff frequency for reverse waves; the dimensions and direction of magnetization of the waveguide can be tailored so that, in a particular embodiment, the cutoff frequency for forward propagating waves is lower than the cutoff frequency for reverse waves.

31 Claims, 12 Drawing Sheets

(56) References Cited

U.S. PATENT DOCUMENTS

| 8,855,451 | B2* | 10/2014 | Yoshie et al. | 385/14 |
|---|---|---|---|---|
| 2005/0024167 | A1 | 2/2005 | Rawnick et al. | |
| 2006/0103380 | A1 | 5/2006 | Kochergin et al. | |
| 2008/0218841 | A1 | 9/2008 | Iwasaki et al. | |
| 2008/0219628 | A1 | 9/2008 | Podolskiy et al. | |
| 2009/0060411 | A1 | 3/2009 | Levy et al. | |
| 2009/0208165 | A1 | 8/2009 | Nakajima et al. | |
| 2011/0111133 | A1 | 5/2011 | Zhou et al. | |
| 2011/0308735 | A1 | 12/2011 | Takeuchi et al. | |

OTHER PUBLICATIONS

Amemiya et al., "Waveguide-Based 1.5 Optical Isolator Based on Magneto-Optic Effect in Ferromagnetic MnAs", The Japan Society of Applied Physics, vol. 46, No. 1, 2007 pp. 205-210.

Amemiya et al., "1.54-um TM-mode waveguide optical isolator based on the nonreciprocal-loss phenomenon: device design to reduce insertion loss," Applied Optics, vol. 46, No. 23, Aug. 8, 2010 pp. 5784-5791.

Shimizu et al., "Fabrication and Characterization of an InGaAs/InP Active Waveguide Optical Isolator With 14.7 dB/mm TE mode Nonreciprocal Attenuation," Journal of Lightwave Technology, vol. 24, No. 1, Jan. 2006, pp. 39-43.

Hemme et al., "Integrated optical isolator based on nonreciprocal-mode cut-off," Applied Optics, vol. 29, No. 18, Jun. 20, 1990, pp. 2741-2744.

Priye et al., "Nonreciprocal behavior of leaky gyroscopic waveguide," Electronics Letters, vol. 29, No. 1, Jan. 7, 1993, pp. 104-105.

Dionne et al., "Spectra origins of giant Faraday rotation and ellipticity in Bi-substituted magnetic garnets,"Journal of Applied Physics, vol. 73, May 15, 1993, pp. 6127-6129.

Korner et al., "Integration of magneto-optical active bismuth iron garnet on nongarnet substrates," Journal of Applied Physics (103), (07B337), Mar. 27, 2008.

Tang et al., "Single-mode waveguide optical isolator based on direction-dependent cutoff frequency," Optics Express, vol. 16, No. 20, Sep. 29, 2008, pp. 16202-16208.

Drezdzon et al., "On-chip waveguide isolator based on bismuth iron garnet operating via nonreciprocal single-mode cutoff," Optics Express, vol. 17, No. 11, May 25, 2009, pp. 9276-9281.

* cited by examiner

POLYMER OPTICAL ISOLATOR

CROSS REFERENCE TO RELATED APPLICATIONS

This application claims the benefit of U.S. Provisional Application No. 61/802,172, filed on Mar. 15, 2013, the disclosure of which is hereby incorporated by reference. The disclosures of the following applications are also hereby incorporated by reference: U.S. application Ser. No. 13/219, 355 filed Aug. 26, 2011; U.S. application Ser. No. 12/496,630 filed Jul. 1, 2009 (now U.S. Pat. No. 8,009,942); and U.S. Provisional Application No. 61/133,609 filed Jul. 1, 2008.

BACKGROUND OF THE INVENTION

Optical isolators are optical components that transmit light in one direction but block it in the backward-propagating direction. They are used when the reversely-propagating light needs to be avoided. For example, lasers become instable when reflected light comes back to them.

Conventional optical isolators consist of a Faraday rotator and two polarizers. The linear-polarization angle needs to be rotated by 45 degrees in a Faraday rotator, which is typically a few millimeters long. Thus, this type of optical isolator becomes relatively large. It is also a challenge to build Faraday rotators and polarizers in a guided-optics format, i.e. it is hard to integrate them on chip. In order to construct guided-wave optical isolators, an asymmetric Mach-Zehnder waveguide interferometer is commonly used. This optical isolator does not require polarizers, but requires high-precision interference for blocking backward propagating light waves; one branch of the interferometer is a nonreciprocal phase shifter, and the other is a reciprocal phase shifter. However, this optical isolator still requires two long waveguides.

U.S. Pat. No. 8,009,942 ("Yoshie et al.") describes an optical isolator implemented as a waveguide section utilizing materials that induce a propagation constant shift that is propagation-direction dependent. Yoshie et al. describes an isolator characterized by a cutoff frequency for forward propagating waves that is different than the cutoff frequency for reverse waves. Yoshie et al. describes use of magneto-optical materials in a wave guide to construct a wave guide with a cross section that is inhomogeneous in terms of magnetic properties.

SUMMARY OF THE INVENTION

It is possible to construct a waveguide isolator characterized by cutoff frequencies that are propagation-direction dependent using crystalline magnetic materials such as bismuth-substituted iron garnets and GaAs:Mn. However, fabricating crystalline magneto-optical materials requires certain substrates such as, for example garnets and GaAs. Due to this limitation, it is a challenge to build optical isolators on some popular low-cost substrates such as silicon, silica and plastics. However, recently, some polymer materials have been found to show the Faraday Effect. Such polymers can provide magneto-optical media for constructing waveguides on substrates that are more readily compatible with typical materials used for mass-produced chips.

One embodiment of the present invention provides an optical isolator comprising a waveguide that includes polymer magneto-optical media. In a particular embodiment, the waveguide is dimensioned for single mode operation in the selected isolation range. A cross-section of the waveguide is inhomogeneous in terms of magneto-optical materials. Polymer magneto-optical material is a part of the optical waveguide structure. The inhomogeneity induces the propagation constant shift, which is propagation-direction-dependent. In a typical embodiment, this device works as an optical isolator from a cut-off frequency of the lowest mode forward waves (lower frequency) to one for the lowest mode reverse waves (higher frequency). However, in some embodiments, a device might works as an optical isolator from a cut-off frequency of the lowest forward mode waves (lower frequency) to a cutoff frequency of a different reverse mode (e.g., the next highest reverse mode rather than the lowest reverse mode).

An embodiment of the present invention includes a waveguide section utilizing materials that induce a propagation constant shift that is propagation-direction-dependent. An embodiment of the inventive isolator is characterized by a cutoff frequency for forward propagating waves that is different than the cutoff frequency for reverse waves; the dimensions and direction of magnetization of the waveguide can be tailored so that, in a particular embodiment, the cutoff frequency for forward propagating waves is lower than the cutoff frequency for reverse waves.

A particular embodiment is constructed as a single-mode waveguide on a substrate. The cross-section of the waveguide is inhomogeneous in terms of magneto-optic materials. At least one part of the cross-section is a non-reciprocal magneto-optical medium, which has nonzero off-diagonal permittivity tensor components. This inhomogeneity induces the propagation constant shift, which is propagation-direction-dependent so that the device works as an optical isolator from the cutoff frequency of forward waves (lower frequency) to one for reverse waves (higher frequency). Various configurations, i.e. structures with various distributions of the magneto-optical medium, may be used consistent with the principles of the invention.

In some embodiments, the magneto-optical polymer material is magnetized prior to placement within the device that includes the optical isolator waveguide structure. In some embodiments, the magnetization of the magneto-optical polymer material is provided or enhanced by one or more magnets placed external to the optical isolator structure but within, on, or near the device that includes the optical isolator waveguide structure.

BRIEF DESCRIPTION OF THE DRAWINGS

The novel features of the invention are set forth in the appended claims. However, for purpose of explanation, several aspects of a particular embodiment of the invention are described by reference to the following figures.

DETAILED DESCRIPTION OF THE INVENTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
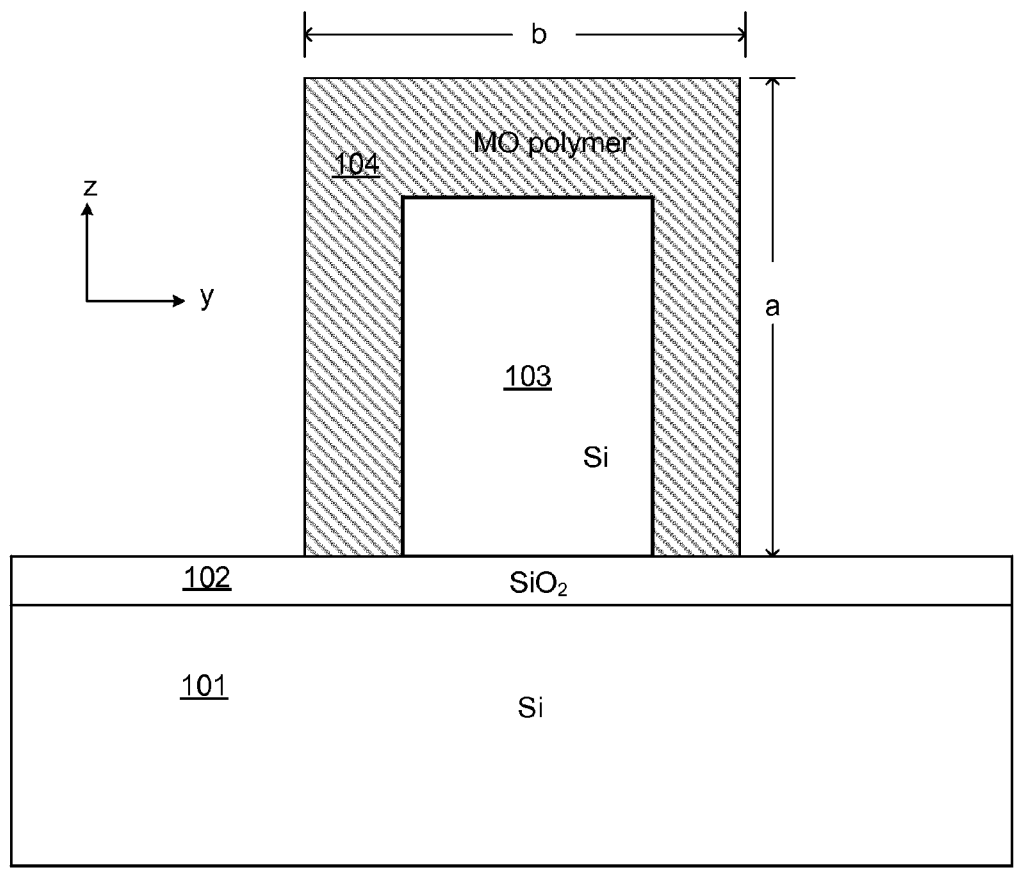
FIG. 1 illustrates an optical isolator 100 in accordance with one embodiment of the invention.

FIG. 1 illustrates an optical isolator 100 in accordance with one embodiment of the invention. Optical isolator 100 includes substrate portions 101 and 102, first waveguide portion 103, and second waveguide portion 104. In the illustrated embodiment, substrate portion 102 comprises silicon dioxide (SiO2) (which is a thin layer on top of silicon portion 101). However, in other embodiments, a substrate portion such as substrate portion 102 may comprise other materials, preferably a dielectric materials having a low refractive index. First waveguide portion 103 comprises silicon (Si). Second waveguide portion 104 comprises a magneto-optical polymer ("MO polymer").

The example of FIG. 1 may be constructed by, for example, on a silicon-on-insulator ("SOI") wafer, patterning a silicon layer with high resolution lithography and dry etching to form a silicon waveguide on silica. Then, a magneto-optical polymer, for example, an electronic-grade poly(3-dodecylthiophene-2,5-diyl), can be spun-coated to form portion 104. The optical mode propagation is non-reciprocal for TM-like modes due to asymmetry of the magneto-optical media distribution in the vertical (z) direction. The aspect ratio for supporting the lowest TM-like mode is such that dimension a is larger than b. The waveguide is dimensioned to support a single mode for a TM-like mode.

Figure 2:
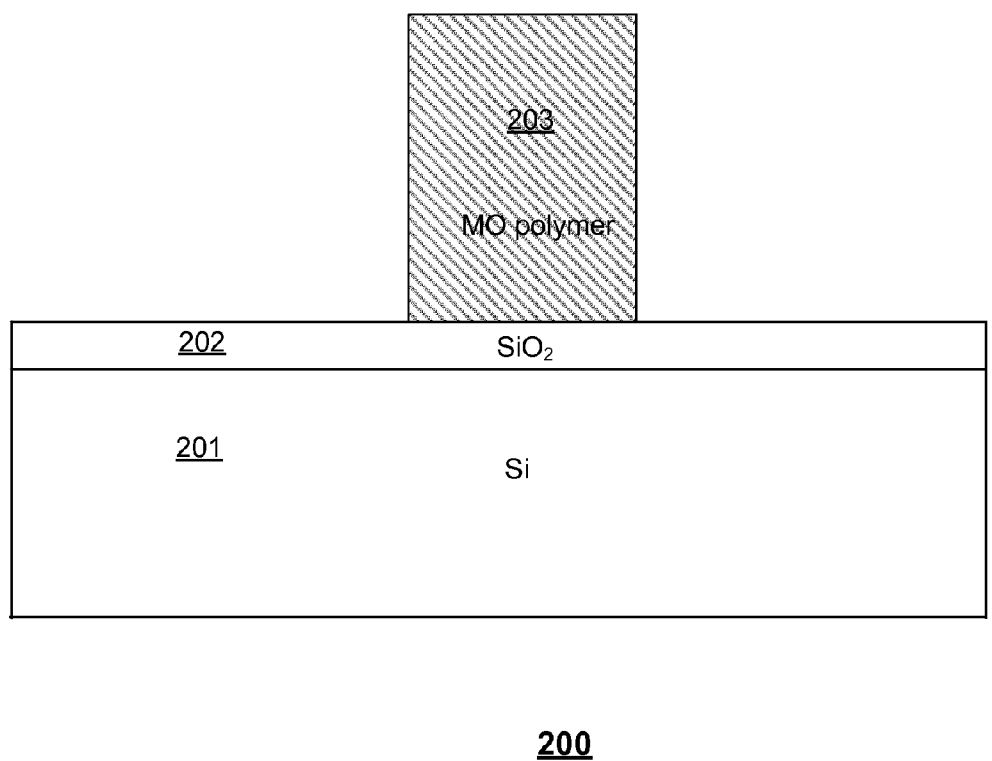
FIG. 2 illustrates an optical isolator 200 in accordance with another embodiment of the invention.

FIG. 2 illustrates an optical isolator 200 in accordance with another embodiment of the invention. The example of FIG. 2 may be constructed, for example, on a thermally oxidized silicon substrate, coating and patterning a magneto-optical polymer by using spin coating and photolithography and dry etching to form a magneto-optical polymer waveguide portion 203 on top of silicon dioxide portion 202 (which is a thin layer on top of silicon portion 201 formed from thermally oxidizing a silicon substrate). It should be understood that in some embodiments of the invention, including the embodiment of FIG. 2, optical intensity may exist in a portion of the substrate. For example, in the embodiment of FIG. 2, some optical intensity resides in a portion of silica layer 202, which is non-magnetic. Thus, the combination of magneto-optical polymer portion 203 and a portion of silica layer 202 provides a waveguide that is inhomogeneous in terms of magnetic properties. In the illustrate embodiment, the optical mode propagation is non-reciprocal for a single-mode TM-like mode.

Figure 3:
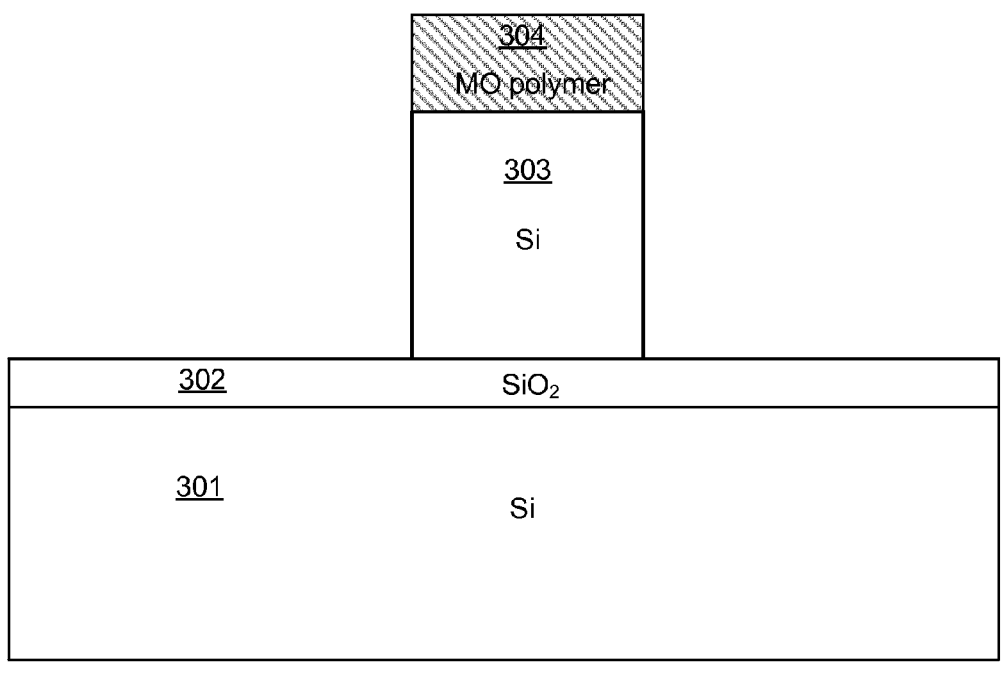
FIG. 3 illustrates an optical isolator 300 in accordance with another embodiment of the invention.

FIG. 3 illustrates an optical isolator 300 in accordance with another embodiment of the invention. The example of FIG. 3 may be constructed, for example, on a SOI substrate, coating a magneto-optical polymer and then coating and patterning the silicon and magneto-optical polymer after coating the magneto-optical polymer. The resulting isolator 300 comprises silicon portion 303 and magneto-optical polymer portion 304 arranged as shown on silicon dioxide portion 302 (which is a thin layer on top of silicon portion 301). The optical mode propagation is non-reciprocal for a single-mode TM-like mode.

Figure 4:
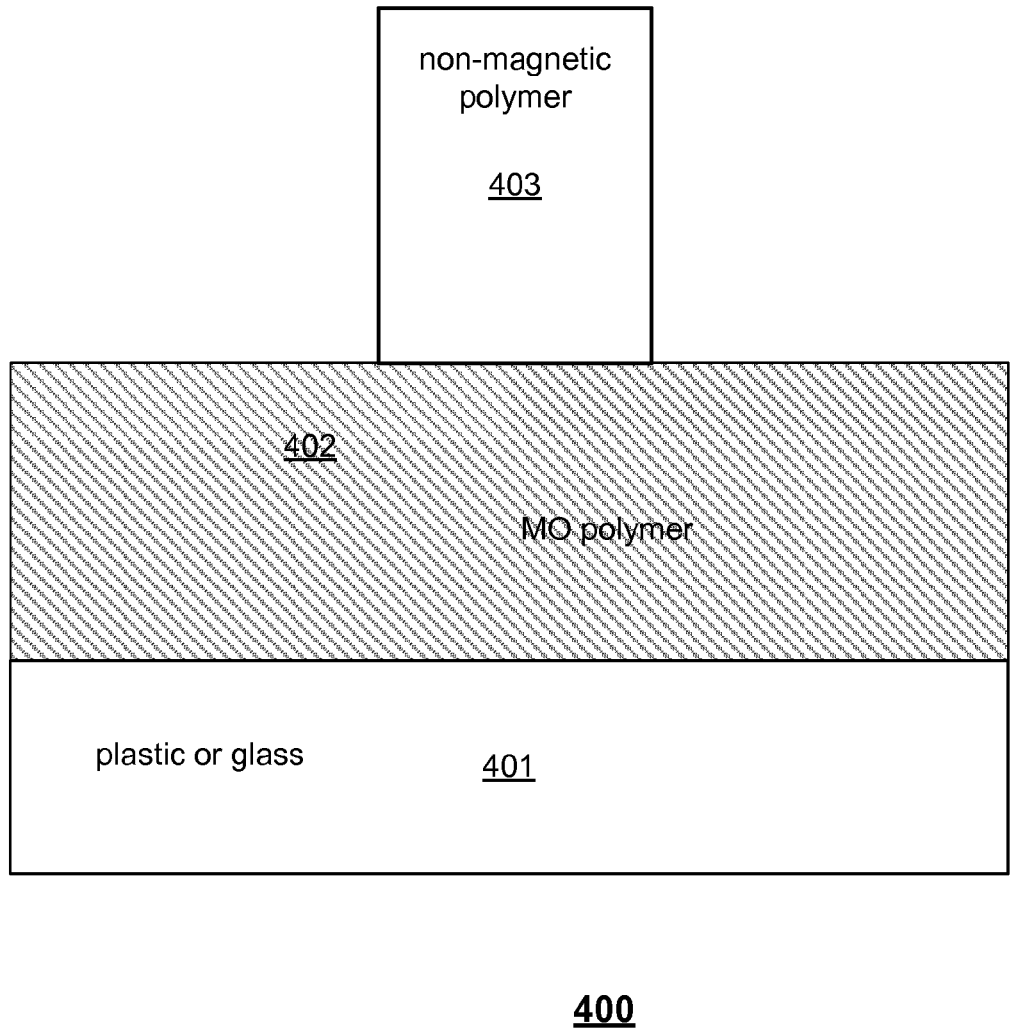
FIG. 4 illustrates an optical isolator 400 in accordance with another embodiment of the invention.

FIG. 4 illustrates an optical isolator 400 in accordance with another embodiment of the invention. The example of FIG. 4 may be constructed, for example, on a plastic (or glass) substrate 401, coating a magneto-optical polymer and a non-magnetic polymer and patterning the non-magnetic polymer by photolithography and dry etching to form magneto-optical polymer portion 402 and non-magnetic polymer portion 403. The optical mode propagation is non-reciprocal for single-mode TM-like modes.

Figure 5:
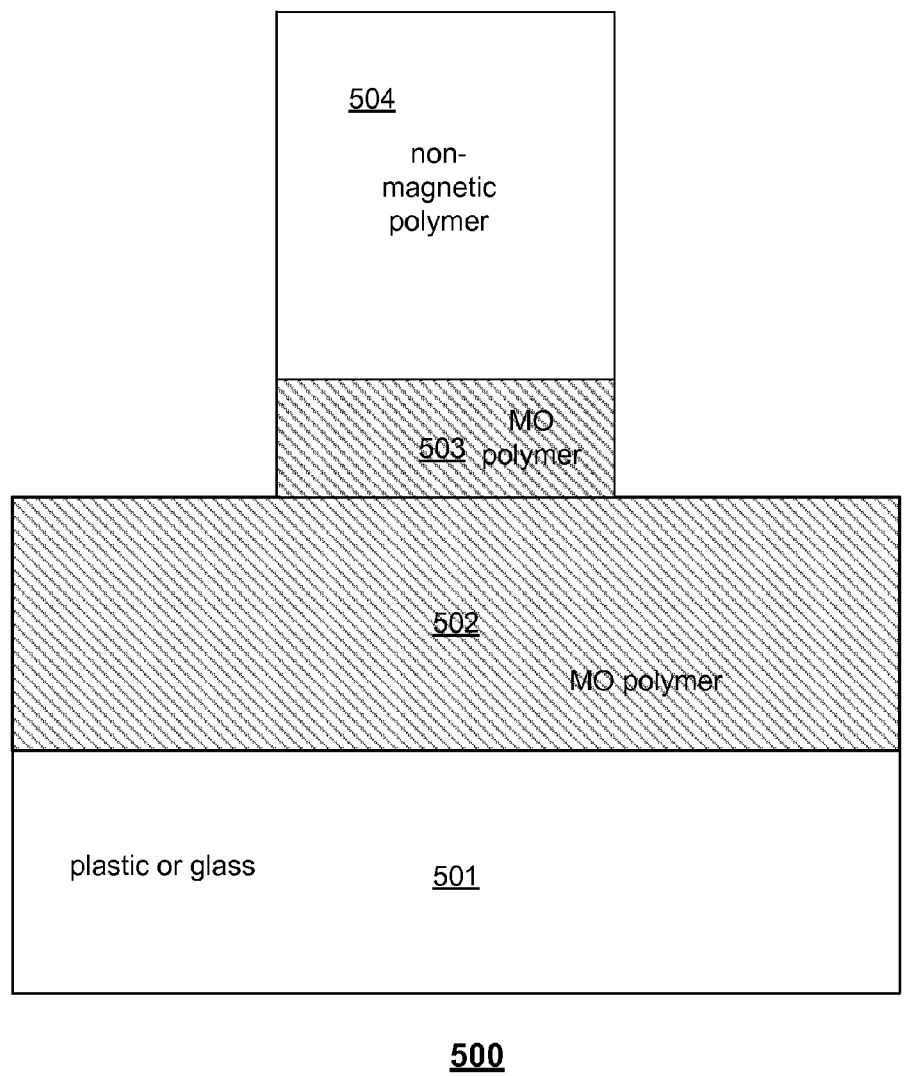
FIG. 5 illustrates an optical isolator 500 in accordance with another embodiment of the invention.

FIG. 5 illustrates an optical isolator 500 in accordance with another embodiment of the invention. The example of FIG. 5 may be constructed, for example, on a plastic (or glass) substrate 501, coating a magneto-optical polymer and a non-magnetic polymer and patterning the non-magnetic polymer by photolithography and further patterning the non-magnetic polymer and a portion of the magneto-optical polymer by dry etching. As shown, this results in a first magneto-optical polymer portion 502, a second magneto-optical polymer portion 503, and a non-magneto-optical polymer portion 504. The optical mode propagation is non-reciprocal for a single-mode TM-like mode.

Figure 6:
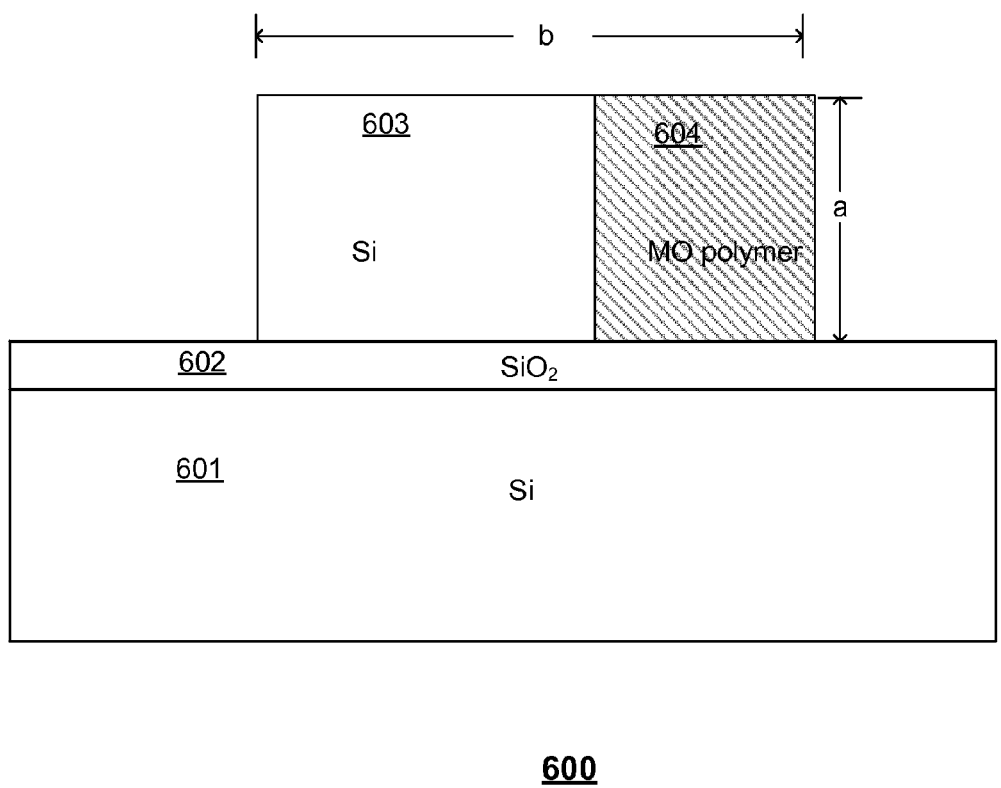
FIG. 6 illustrates an optical isolator 600 in accordance with another embodiment of the invention.

FIG. 6 illustrates an optical isolator 600 in accordance with another embodiment of the invention. The example of FIG. 6 may be constructed, for example, on a SOI substrate, patterning a silicon layer by lithography and dry etching and coating and patterning a magneto-optical polymer by spin coating and lithography with alignment and dry etching to form adjacent portions 603 (silicon) and 604 (magneto-optical polymer) on silicon dioxide portion 602 (which is a thin layer on top of silicon portion 601). The optical mode propagation is non-reciprocal for a single-mode TE-like mode. To support a TE-like mode as the lowest mode, the waveguide is dimensioned to have an aspect ratio such that dimension a is less than dimension b.

Figure 7:
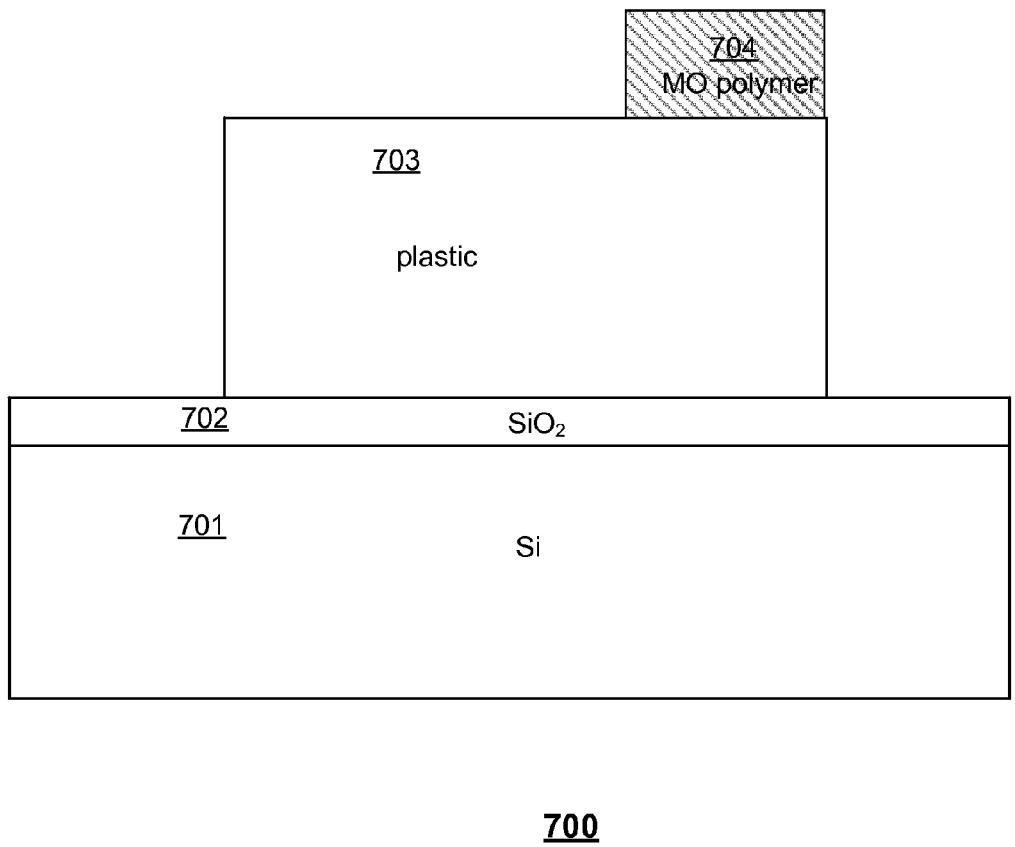
FIG. 7 illustrates an optical isolator 700 in accordance with another embodiment of the invention.

FIG. 7 illustrates an optical isolator 700 in accordance with another embodiment of the invention. The example of FIG. 7 may be constructed, for example, on a thermally oxidized substrate (comprising silicon portion 701 and silicon dioxide portion 702), coating and patterning a plastic layer to form portion 703 and coating and patterning a magneto-optical polymer to form portion 704 by spin coating and lithography with alignment and dry etching. The optical mode propagation is non-reciprocal for a single-mode TE-like mode.

Figure 8:
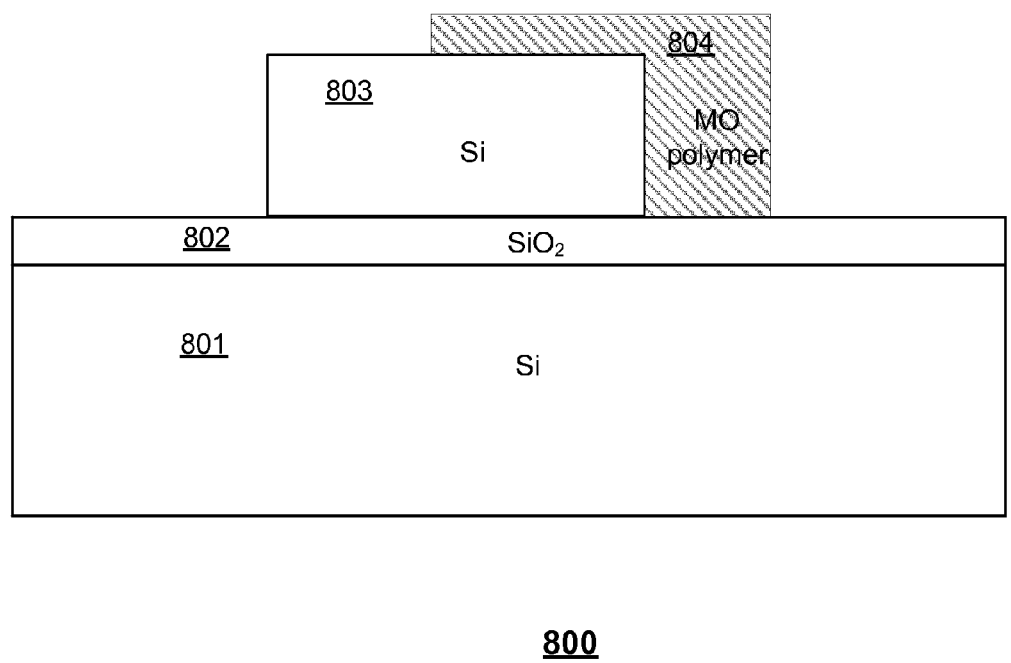
FIG. 8 illustrates an optical isolator 800 in accordance with another embodiment of the invention.

FIG. 8 illustrates an optical isolator 800 in accordance with another embodiment of the invention. The example of FIG. 8 may be constructed, for example, on a SOI substrate, patterning a silicon layer by lithography and dry etching and coating and patterning a magneto-optical polymer by spin coating and lithography with alignment and dry etching to form silicon portion 803 and magneto-optical polymer portion 804, arranged as shown on silicon dioxide layer 802 (which is a thin layer on top of silicon layer 801. The optical mode propagation is non-reciprocal for a single-mode TE-like mode.

Figure 9:
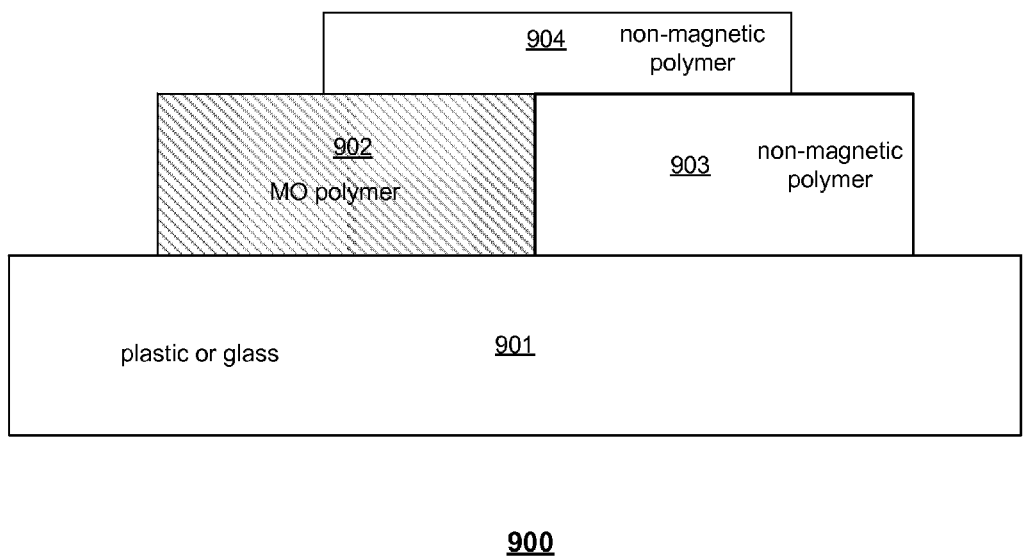
FIG. 9 illustrates an optical isolator 900 in accordance with another embodiment of the invention.

FIG. 9 illustrates an optical isolator 900 in accordance with another embodiment of the invention. The example of FIG. 9 may be constructed, for example, on a plastic (or glass) substrate 901, coating and patterning a magneto-optical polymer to form portion 902, followed by coating and patterning of a non-magnetic polymer to form portions 903 and 904. The optical mode propagation is non-reciprocal for a single-mode TE-like mode. In one particular embodiment, portion 903 may comprise $SiO_2$ and portion 904 may comprise amorphous silicon in the form of, respectively, spin-on glass and spin-on silicon. Although most silicon and silica materials used in industry are not polymers, spin-on-glass and spin-on-silicon are silicon-containing polymers dissolved in a solvent or formed in a sol-gel manner, and they can be spin coated on substrates. After annealing, they become like silica and amorphous silicon, respectively.

As those skilled in the art will appreciate, the exact relative sizes of the various waveguide portions (e.g., the relative size of the MO polymer portion relative to a non-magnetic polymer portion or silicon portion) will depend on the properties of the particular materials used. For example, depending on the permittivity values and related refractive indices of the materials used, the desired relative sizes of the MO polymer portion relative to other portion or portions may vary for different implementations.

The following equations can be used to optimize the isolation for a particular implementation. In general, position-dependent permittivity tensor is given by the addition of two permittivity tensors:

$$\tilde{\varepsilon} = \begin{pmatrix} \varepsilon_{xx} & 0 & 0 \\ 0 & \varepsilon_{yy} & 0 \\ 0 & 0 & \varepsilon_{zz} \end{pmatrix} + \begin{pmatrix} 0 & iu & -iw \\ -iu & 0 & iv \\ iw & -iv & 0 \end{pmatrix} = \tilde{\varepsilon}_o + \Delta\tilde{\varepsilon} \quad (1)$$

The tensors $\tilde{\varepsilon} \in$ Hermitian, and $\Delta\tilde{\varepsilon}$ is considered as a perturbation term. The propagation constant shift is written, using equation (1), as:

$$\Delta\beta(\omega) = \frac{2\omega^2(I_{yx} + I_{xz} + I_{zy})}{c^2 \beta_0} \quad (2)$$

where $\omega$ is the angular frequency, $E(y,z)$ is the normalized electric field, and x is the propagation direction and $$I_{yx} = \iint u(y,z) Im[E_y^*(y,z)E_x(y,z)] dy dz$$

$$I_{zy} = \iint v(y,z) Im[E_z^*(y,z)E_y(y,z)] dy dz$$

$$I_{xz} = \iint w(y,z) Im[E_x^*(y,z)E_z(y,z)] dy dz. \quad (3)$$

Given the electric field $E(y,z)$ and dispersion $\underline{\omega}(\beta)$ of an un-perturbed mode and small perturbation $\Delta\tilde{\varepsilon}(y,z)$, we can obtain the dispersion relation $\underline{\omega}(\beta+\Delta\beta)$ of forward (+) and backward (+) propagating waves from equation (2). The isolation frequency range can be maximized by maximizing $\Delta\beta$. In a relatively narrow frequency range, $\Delta\beta$ is proportional to the isolation frequency range.

In some embodiments, the MO polymer material is magnetized prior to being placed within the device that includes the optical isolating waveguide. However, in other embodiments, magnetization of the MO polymer waveguide portion may be achieved or enhanced by magnets placed external to the wave guide structure.

Figure 10:
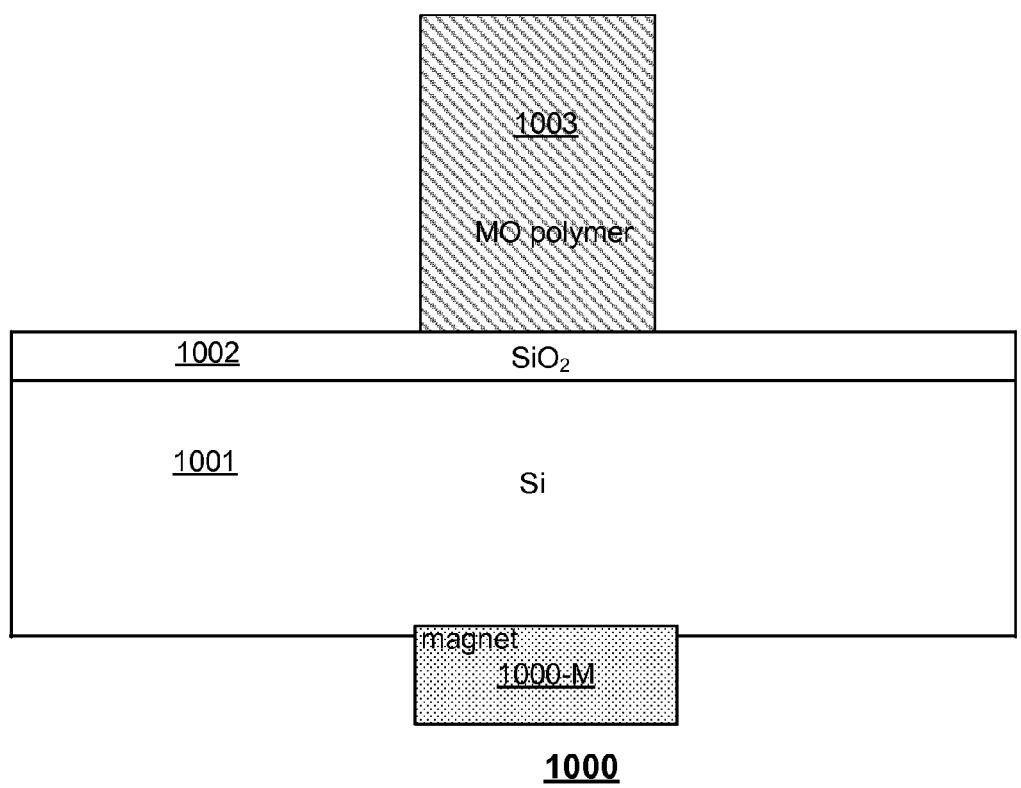
FIG. 10 illustrates an optical isolator 1000 in accordance with another embodiment of the invention.
Figure 11:
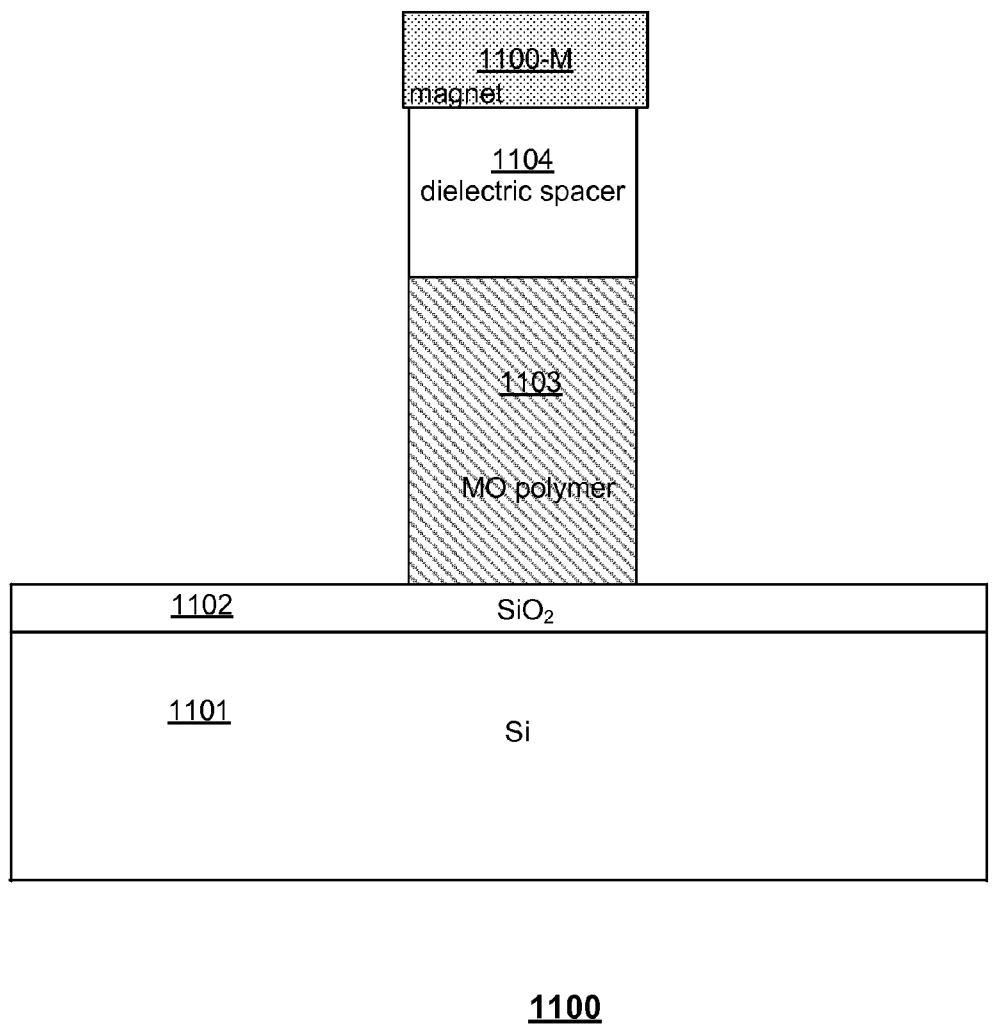
FIG. 11 illustrates an optical isolator 1100 in accordance with another embodiment of the invention.
Figure 12:
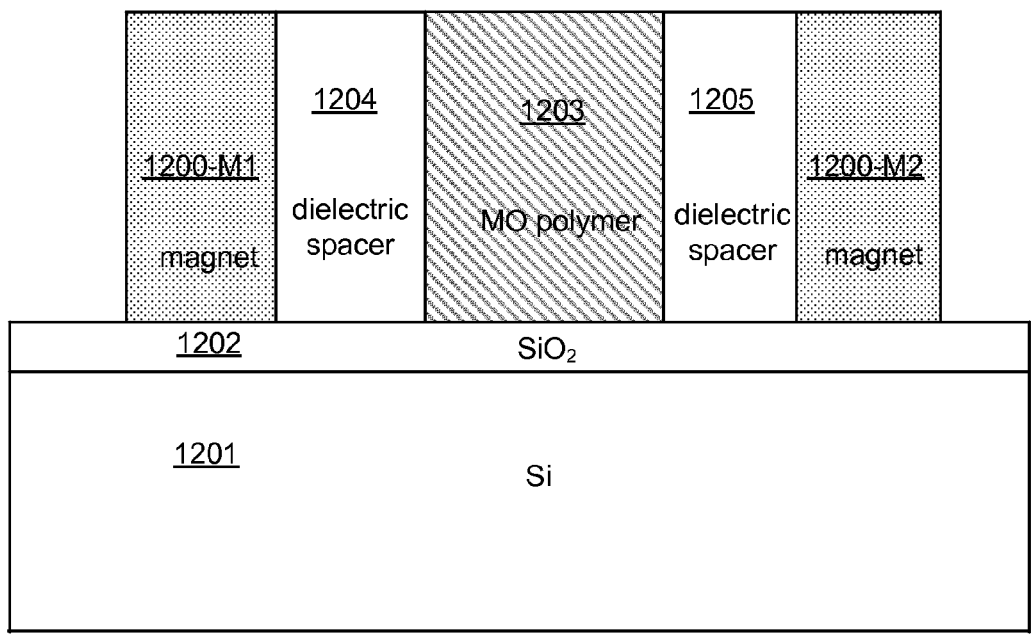
FIG. 12 illustrates an optical isolator 1200 in accordance with another embodiment of the invention.

FIGS. 10-12 illustrate various examples in which magnets are placed external to the wave guide structure to effect and/or enhance the magnetization of the relevant MO polymer waveguide portion. Although the examples are illustrated in the context of a waveguide isolator structure similar to that shown in FIG. 2, magnets may be used in conjunction with other illustrated embodiments.

FIG. 10 illustrates optical isolator 1000 in accordance with another embodiment of the invention. In the FIG. 10 embodiment, a magnet 1000-M is placed in or just below the substrate comprising silicon portion 10001. Silicon portion 1001 and silicon dioxide portion 1002 form a substrate under magneto-optical polymer portion 1003.

FIG. 11 illustrates optical isolator 1100, in accordance with another embodiment of the invention. In the FIG. 11 embodiment, a magnet 1100-M is placed above the waveguide structure. Dielectric spacer 1104 is between magnet 1100-M and magneto-optical polymer portion 1103, which rest on silicon dioxide portion 1102 (which is a thin layer on top of silicon portion 1101).

FIG. 12 illustrates optical isolator 1200 in accordance with another embodiment of the invention. In the FIG. 12 embodiment, magnets are placed on both sides of the waveguide structure. Specifically, magnet 1200-M1 is place on the left and magnet 1200-M2 is place on the right. Dielectric spacer 1204 is placed between magnet 1200-M1 and magneto-optical polymer portion 1203. Dielectric spacer 1205 is placed between magnet 1200-M2 and magneto-optical polymer portion 1203. Magnet 1200-M1, dielectric spacer 1204, magneto-optical polymer portion 1203, dielectric spacer 1205, and magnet 1200-M2 reside on top of silicon dioxide portion 1202 (which is a thin layer on top of silicon portion 1201).

Magnets are absorptive and, therefore, in the illustrated embodiments, the magnets are placed at a distance from the waveguide structure. In one embodiment, the magnets are placed one wavelength away (as measured in the dielectric material placed between the magnet and the waveguide). In some embodiments, magnet(s) are placed to optimize the magnetic flux through the relevant waveguide portion.

While the present invention has been particularly described with respect to the illustrated embodiments, it will be appreciated that various alterations, modifications and adaptations may be made based on the present disclosure and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the inventive principles described herein.

What is claimed is:

1. A waveguide configured as an optical isolator, a cross section of the waveguide that is perpendicular to a propagation direction comprising:
   a first portion comprising a first optical material having first magnetic properties; and
   a second portion comprising a second optical material having second magnetic properties different from the first magnetic properties, the second material being a magneto-optical polymer;
   wherein the waveguide is structured such that, given a difference between the first magnetic properties and the second magnetic properties, the waveguide has a cutoff frequency in a forward propagation direction that is different than a cutoff frequency in a reverse propagation direction.

2. The waveguide of claim 1 wherein the first optical material comprises silicon.

3. The waveguide of claim 1 wherein the first magnetic properties are that the first material is non-magnetic.

4. The waveguide of claim 2 wherein the second portion is adjacent to top, left, and right sides of the first portion, the first and second portions being on a substrate of the waveguide.

5. The waveguide of claim 1 wherein the second portion is adjacently above the first portion and the first portion is in a substrate of the waveguide.

6. The waveguide of claim 5 wherein the first optical material comprises silicon dioxide and the first portion resides in at least a portion of a silicon dioxide substrate layer of the waveguide substrate, the silicon dioxide substrate layer being on top of a silicon substrate layer of the waveguide substrate.

7. The waveguide of claim 1 wherein the second portion is adjacently above the first portion, the first portion is on a substrate of the waveguide, and the first optical material comprises silicon.

8. The waveguide of claim 1 wherein the first portion is adjacently above the second portion and the second portion is in a substrate of the waveguide.

9. The waveguide of claim 1 wherein:
the first portion is adjacently above the second portion;
a first part of the second portion resides in at least a portion of a substrate of the waveguide;
and a second part of the second portion resides adjacently above the substrate portion of the waveguide.

10. The waveguide of claim 9 wherein the substrate portion of the waveguide is a first substrate portion of the waveguide and is on a second substrate portion of the waveguide, the second substrate portion of the waveguide comprising a material selected from the group consisting of plastic and glass.

11. The waveguide of claim 1 wherein the first optical material comprises an non-magnetic polymer.

12. The waveguide of claim 8 wherein the first optical material comprises an non-magnetic polymer.

13. The waveguide of claim 9 wherein the first optical material comprises an non-magnetic polymer.

14. The waveguide of claim 1 wherein the first portion and the second portion are adjacent to each other on a substrate of the waveguide.

15. The waveguide of claim 14 wherein the first optical material is silicon.

16. The waveguide of claim 15 wherein the substrate of the waveguide comprises a silicon dioxide substrate layer and a silicon substrate layer below the silicone dioxide substrate layer.

17. The waveguide of claim 1 wherein the second portion is adjacently above the first portion and the first portion is on a substrate of the waveguide, the second portion being smaller in area than the first portion.

18. The waveguide of claim 17, wherein the second portion is substantially smaller in area than the first portion, the first material comprising plastic.

19. The waveguide of claim 18 wherein the substrate of the waveguide comprises a silicon dioxide substrate layer and a silicon substrate layer below the silicone dioxide substrate layer.

20. The waveguide of claim 14 wherein the second portion extends along a portion of a top side of the first portion.

21. The waveguide of claim 20 wherein the first optical material is silicon.

22. The waveguide of claim 21 wherein the substrate of the waveguide comprises a silicon dioxide substrate layer and a silicon substrate layer below the silicone dioxide substrate layer.

23. The waveguide of claim 1 wherein the first portion and the second portion are adjacent on a substrate of the waveguide, the waveguide further comprising a third portion adjacently above at least a portion of the first portion and a portion of the second portion, the third portion comprising a third optical material.

24. The waveguide of claim 23 wherein the first optical material comprises a first non-magnetic polymer and the third optical material comprises a second non-magnetic polymer.

25. The waveguide of claim 24 wherein the first material comprises silicon dioxide and the second optical material comprises amorphous silicon.

26. The waveguide of claim 23 wherein the substrate of the waveguide comprises a material selected from the group consisting of plastic and glass.

27. The waveguide of claim 1 wherein one or more magnets are located near the waveguide.

28. The waveguide of claim 27 wherein the one or more magnets are located at least one wavelength away from an optical wave propagation region of the waveguide wherein at least one wavelength is measured by the wavelength of an optical wave in material between the one or more magnets and the optical wave propagation region of the waveguide.

29. The waveguide of claim 28 wherein a magnet of the one or more magnets is located in a substrate of the waveguide.

30. The waveguide of claim 28 wherein a magnet of the one or more magnets is located beneath the substrate of the waveguide.

31. The waveguide of claim 28 where the one or more magnets comprise at least first a magnet and a second magnet, a first magnet being located to the left of the optical wave propagation region of the waveguide and the second magnet being located to the right of the optical wave propagation region.

* * * * *